Figure 1:
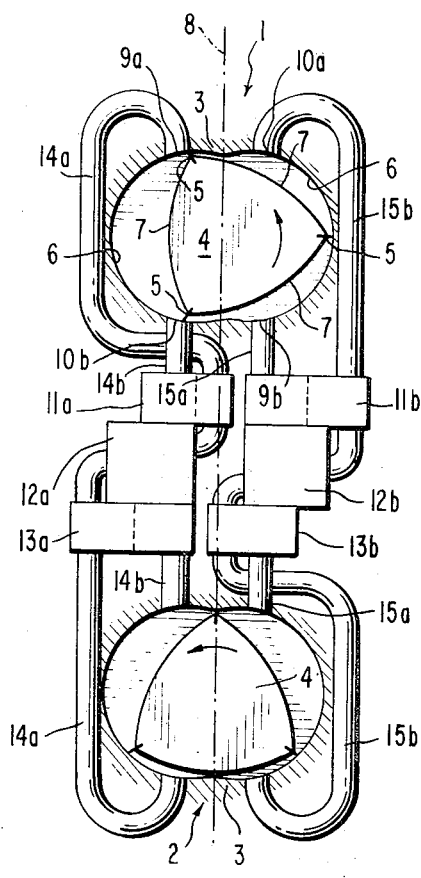

United States Patent [19]

Wahnschaffe et al.

[11] 3,762,167

[45] Oct. 2, 1973

[54] HOT-GAS ROTARY PISTON ENGINE

[75] Inventors: Jürgen Wahnschaffe, Cologne;
Eberhard Braun, Waiblingen, both of Germany

[73] Assignee: Daimler-Benz Aktiengesellschaft, Stuttgart-Untertuerkheim, Germany

[22] Filed: Apr. 12, 1971

[21] Appl. No.: 133,121

[30] Foreign Application Priority Data
Apr. 10, 1970 Germany.................. P 20 17 239.8

[52] U.S. Cl. .................................................... 60/24
[51] Int. Cl. ............................................... F02g 1/04
[58] Field of Search ........................................ 60/24

[56] References Cited
UNITED STATES PATENTS

| | | | |
|---|---|---|---|
| 2,616,248 | 11/1952 | Brey et al. | 60/24 |
| 3,400,281 | 9/1968 | Malik | 60/24 X |
| 3,426,525 | 2/1969 | Rubin | 60/24 |
| 3,483,694 | 12/1969 | Huber et al. | 60/24 |
| 3,509,718 | 5/1970 | Fezer et al. | 60/24 |

*Primary Examiner*—Martin P. Schwadron
*Assistant Examiner*—Allen M. Ostrager
*Attorney*—Craig, Antonelli & Hill

[57] ABSTRACT

A hot gas engine constructed as rotary piston engine of trochoidal construction, which includes two rotary piston engines, of which one is constructed as hot gas unit and the other as cold gas unit; each rotary piston engine includes a housing casing of epitrochoidal shape with a two-arched running surface, along which slides a triangular piston with its piston corners during its rotation on an eccentric shaft; the housing casing is provided within the area of its minor axis with inlet and outlet apertures of which the inlet and outlet apertures are arranged substantially diagonally opposite one another in the housing casing and the outlet apertures of one piston engine are connected with the inlet apertures of the other and vice versa by way of lines containing heaters, recuperators and coolers.

13 Claims, 2 Drawing Figures

INVENTORS
JÜRGEN WAHNSCHAFFE
EBERHARD BRAUN

BY Craig, Antonelli, Stewart & Hill
ATTORNEYS

3,762,167

HOT-GAS ROTARY PISTON ENGINE

The present invention relates to a hot gas engine which is constructed as rotary piston engine of trochoidal type of construction.

A rotary piston engine operating according to the hot gas principle has already been proposed which consists of a separate compression and expansion engine and which is equipped with complicated installations controlling the working medium flowing to and fro between the engine units.

The present invention is concerned with the task to eliminate this disadvantageous and costly constructional expenditure with the additionally occurring friction and throttling losses in an advantageous manner by simple structural measures.

The underlying problems are solved according to the present invention in that two mutually opposite and phase-displaced rotary piston engines, of which one rotary piston engine is constructed as hot gas part and the other as cold gas part, include each a conventional epitrochoidally shaped, two-arched housing casing and a triangular piston rotating on an eccentric shaft as inner envelope and in that the housing casing of each engine is provided within the area of its minor axis with inlet and outlet apertures, of which the inlet and outlet apertures are arranged respectively mutually diagonally in the two-arched housing casing and the outlet apertures of one rotary piston engine are connected with the inlet apertures of the other rotary piston engine and vice versa by way of lines containing heater, recuperator and cooler means.

In a structurally favorable manner, one line each provided for a forward flow (to-flow) and one line each provided for a return flow (from-flow) may be arranged in parallel in the heater and cooler constructed with two chambers separated from one another but may be arranged cross-wise in a common recuperator for the forward and return flow.

In an advantageous construction of the present invention, the lines provided respectively for the hot gas and for the cold gas and mutually separated from one another may also extend pairwise in a parallel arrangement through the heaters, recuperators, and coolers.

The application of the rotary piston engines operating according to the hot gas Stirling principle is advantageous compared to the known double-acting Stirling reciprocating piston engines operating with discontinuous motion by reason of the complete mass equalization, the compact construction and the specific weight resulting therefrom.

Accordingly, it is an object of the present invention to provide a hot gas rotary piston engine which avoids by simple means the aforementioned shortcomings and drawbacks encountered in the prior art.

Another object of the present invention resides in a hot gas rotary piston engine which obviates the need for complicated control devices controlling the working medium flowing to and fro between the engine units.

A further object of the present invention resides in a hot gas rotary piston engine of trochoidal construction which eliminates by simple means friction and throttling losses, heretofore encountered with the prior art constructions.

Still another object of the present invention resides in a hot gas rotary piston engine which assures a complete mass equalization, a compact construction, and a low specific weight.

Figure 2:
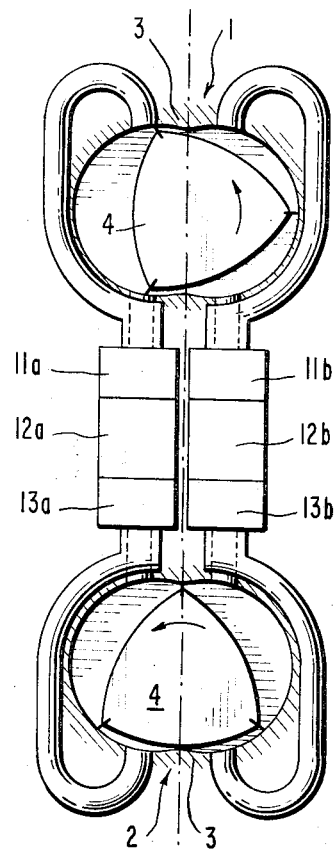

These and further objects, features and advantages of the present invention will become more obvious from the following description when taken in connection with the accompanying drawing which shows, for purposes of illustration only, two embodiments in accordance with the present invention, and wherein:

FIG. 1 is a somewhat schematic view of two rotary piston engines operating for the hot gas operation in accordance with the present invention with a first embodiment of a line system between the two engine units; and FIG. 2 is a somewhat schematic view of two rotary piston engines operating for the hot gas operation in accordance with the present invention with a modified construction of a line system between the two engine units.

Referring now to the drawing wherein like reference numerals are used throughout the two views to designate like parts, and more particularly to FIG. 1, two rotary piston engines generally designated by reference numerals 1 and 2 and operating with a corresponding phase displacement, each consist in this figure of a stationary two-arched housing casing 3 and of a triangular piston 4 rotating within the housing casing 3. The piston 4 provided with three sealing bars 5 which is rotatably supported on an eccentric shaft (not shown) of conventional construction and which slides with its piston corners along a casing running surface 6 of the housing casing 3, controls with its three flanks 7 the inlet and outlet apertures arranged pairwise in the trochoid within the area of the minor axis 8, of which the inlet apertures 9a and 9b are arranged shortly behind or downstream of the minor axis 8 in the direction of rotation of the piston 4—as indicated by the arrows—and the outlet apertures 10a and 10b are arranged shortly in front of or upstream of the minor axis 8 as viewed in the direction of rotation of the piston 4.

Both engines, i.e., the rotary piston engine 1 constructed as hot gas unit and the rotary piston engine 2 constructed as cold gas unit, are connected with each other by means of their respective analogously arranged inlet and outlet apertures by way of lines under interposition of a heater 11a, 11b, a recuperator 12a, 12b, and a cooler 13a, 13b, all of conventional construction, whereby the heaters and coolers consisting of two separated chambers are traversed in their chambers by respectively only one line 14a or 14b, 15a or 15b provided either for the forward flow or the return flow. The cold gas piston which trails with respect to the hot gas piston by a phase displacement of 90° eccentric shaft angle, displaces the previously compressed working medium into the lines 14a and 15a provided for the forward flow. The working medium flowing into the warm space of the rotary piston engine 1, which expands therein and produces work, then reaches again the cold space of the rotary piston engine 2 by way of the lines 14b and 15b provided for the return flow. This constantly repeating closed thermodynamic cycle realized according to the Stirling principle occurs six times during a complete rotation of a piston.

The arrangement of the line system is so made that the lines 14a, 14b and 15a, 15b arranged pairwise between the two engine units extend initially in parallel through the separate chambers of the coolers 13a, 13b and heaters 11a, 11b but each traverse through the recuperator 12a or 12b in common, though separately and cross-wise.

The engine illustrated according to FIG. 2 of similar construction as in FIG. 1, is provided with a line system whose lines provided in the heater, recuperator, and cooler for the hot gas stream in one direction and for the cold gas stream in the other direction are arranged parallelly and separately adjacent one another.

The rotary piston engines according to FIGS. 1 and 2 provided with circumferential control means may be possibly replaced for reasons of a considerably more compact construction, by rotary piston engines whose inlet and outlet apertures are not arranged in the casing running surfaces but at the lateral parts of the engine.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A hot gas engine comprising first and second troichoidal chambers, said first chamber being constructed as a hot gas section and said second chamber being constructed as a cold gas section, a polygonal piston rotatably mounted in each chamber, two inlet ports and two outlet ports in each of said chambers, said inlet ports being arranged diagonally opposite one another at first and second sides of each of said chambers, said outlet ports being arranged diagonally opposite one another at said first and second sides of each of said chambers, first line means leading from the outlet port at the first side of said first chamber to the inlet port at the first side of said second chamber by way of serially arranged heater means, recuperator means and cooler means, second line means leading from the outlet port at the second side of said first chamber to the inlet port at the second side of said second chamber by way of serially arranged hater means, recuperator means and cooler means, third line means leading from the outlet port at the first side of said second chamber to the inlet port at the first side of said first chamber by way of serially arranged cooler means, recuperator means and heater means, and fourth line means leading from the outlet port at the second side of said second chamber to the inlet port at the second side of said first chamber by way of serially arranged cooler means, recuperator means and heater means, wherein common heater means, recuperator means and cooler means are provided for said first and third line means, said first and third line means being arranged parallelly adjacent one another as they extend in respective opposite directions through the respective common heater means, recuperator means and cooler means, and wherein common heater means, recuperator means and cooler means are provided for said second and fourth line means, said second and fourth line means being arranged parallelly adjacent one another as they extend in respective opposite directions through the respective common heater means, recuperator means and cooler means.

2. A hot gas engine according to claim 1, wherein each of said heater means is located outside of said chambers at a position spaced from said ports.

3. A hot gas engine according to claim 2, wherein each of said cooler means is located outside of said chambers at a position spaced from said ports.

4. A hot gas engine according to claim 1, wherein each of said cooler means is located outside of said chambers at a position spaced from said ports.

5. A hot gas engine according to claim 1, wherein each of the chambers include a two-arched running surface means, wherein the pistons are of triangular configuration and are provided with sealing bars in the piston corners which slide along said running surface means, and wherein said ports are arranged in the running surface means.

6. A hot gas engine according to claim 5, wherein each of said heater means is located outside of said chambers at a position spaced from said ports.

7. A hot gas engine according to claim 6, wherein each of said cooler means is located outside of said chambers at a position spaced from said ports.

8. A hot gas engine according to claim 5, wherein each of said cooler means is located outside of said chambers at a position spaced from said ports.

9. A hot gas engine constructed as rotary piston engine of trochoidal type of construction, characterized in that two oppositely disposed and phase-displaced rotary piston engine units, of which one rotary piston engine unit is constructed as hot gas section and the other as cold gas section, each include an epitrochoidally shaped housing casing means and a polygonal piston means rotating on an eccentric shaft means within the housing casing means, each housing casing means being provided within the area of its minor axis with inlet and outlet aperture means, of which the inlet and outlet aperture means are disposed substantially diagonal to one another, and the outlet aperture means of one piston engine are connected with the inlet aperture means of the other piston engine by way of line means including heater, recuperator and cooler means, wherein the line means are separate from each other for the hot gas and the cold gas and extend pair-wise in a parallel arrangement adjacent one another through the heater, recuperator and cooler means.

10. A hot gas engine according to claim 9, characterized in that the housing casing means includes a two-arched running surface means, and in that the piston means is of triangular configuration provided with sealing bars in the piston corners sliding along said running surface means.

11. A hot gas engine according to claim 10, characterized in that the inlet and outlet aperture means are arranged in the running surface means of the two-arched housing casing means.

12. A hot gas engine according to claim 10, characterized in that the inlet and outlet aperture means are arranged in lateral parts of the housing casing means.

13. A hot gas engine according to claim 9, characterized in that the housing casing means includes a two-arched running surface means, and in that the piston means is of triangular configuration provided with sealing bars in the piston corners sliding along said running surface means.

* * * * *